United States Patent [19]

Mascrier

[11] Patent Number: 5,228,762
[45] Date of Patent: Jul. 20, 1993

[54] METAL CABINET FRAME

[75] Inventor: Pierre Mascrier, Champigny, France

[73] Assignee: Transrack, Bonneuil Sur Marne, France

[21] Appl. No.: 778,135

[22] PCT Filed: May 15, 1991

[86] PCT No.: PCT/FR91/00389

§ 371 Date: Dec. 13, 1991

§ 102(e) Date: Dec. 13, 1991

[87] PCT Pub. No.: WO91/18436

PCT Pub. Date: Nov. 28, 1991

[30] Foreign Application Priority Data

May 18, 1990 [FR] France ............................. 90 06236

[51] Int. Cl.⁵ .............................................. A47B 47/00
[52] U.S. Cl. .............................. 312/265.4; 312/265.1
[58] Field of Search ............... 312/265.4, 265.1, 265.2, 312/265.3, 265.5, 265.6

[56] References Cited

U.S. PATENT DOCUMENTS

| | | | |
|---|---|---|---|
| 2,710,784 | 6/1955 | Morin | 312/265.1 |
| 3,265,455 | 8/1966 | Ferdinand et al. | 312/265.1 |
| 3,563,627 | 2/1971 | Whipps | 312/265.2 |
| 3,655,254 | 4/1972 | Mayer et al. | 312/265.4 |
| 4,126,364 | 11/1978 | Reilly | 312/265.1 |
| 4,643,319 | 2/1987 | Debus et al. | |
| 4,768,845 | 9/1988 | Yeh | |
| 4,997,240 | 3/1991 | Schmalzl et al. | 312/265.2 |

FOREIGN PATENT DOCUMENTS

| | | | |
|---|---|---|---|
| 0144955 | 6/1985 | European Pat. Off. | |
| 86/02245 | 4/1986 | European Pat. Off. | 312/265.2 |
| 2936767 | 3/1981 | Fed. Rep. of Germany | 312/265.3 |
| 2145107 | 2/1973 | France | |
| 2241952 | 3/1975 | France | 312/265.5 |
| 2265302 | 10/1975 | France | |

Primary Examiner—Victor N. Sakran
Attorney, Agent, or Firm—Young & Thompson

[57] ABSTRACT

Metal frame constructed from sections of the same structural element. This structural element is obtained by folding a metal strip to define a substantially square or rectangular cross-section first part (14) and an L-shape cross-section second part (16) and a space is formed between an edge (18) of the metal strip and a fold (19) defining the boundary between said first and second parts so as to define a slot (20) enabling insertion of panel mounting means. Application to the manufacture of metal cabinets for industrial electrical or electronic equipment.

12 Claims, 3 Drawing Sheets

METAL CABINET FRAME

BACKGROUND OF THE INVENTION

The invention concerns a metal cabinet constructed mainly from structural elements with the same cross-section. It is more particularly concerned with a new type of structural element offering multiple advantages and relatively simple to manufacture.

FIELD OF THE INVENTION

The patent document EP 144 955 discloses a type of metal frame made from a single structural element having a square cross-section central part and two orthogonal lateral flanges extending away from respective opposite edges of said central part. A structural element of this kind can be obtained by complex folding of a metal strip. Its unit cost is high because of manufacturing problems and the amount of metal required.

The invention proposes another type of structural element that is simpler to manufacture and less costly and whose structure offers increased possibilities for mounting doors and/or fixed or removable panels.

SUMMARY OF THE INVENTION

To this end, the invention consists in a metal cabinet frame, in particular for electrical or electronic equipment, at least partly constructed from sections of the same structural element comprising a substantially square or rectangular cross-section first part and an L-shape cross-section second part joined to said first part so as to define with it a channel, characterized in that said two parts are defined by parallel folds substantially at right angles in a metal strip, the edge of one face of said first part is constituted by a longitudinal edge of said metal strip, in that this edge faces a fold defining the boundary between said first part and said second part and in that a space is left between said fold and said edge so as to define a longitudinal slot enabling the insertion of panel mounting means.

The slot enables the mounting of removable panels (fitted with simple pivot tabs rather than hinges) capable of replacing doors if the cabinet is in a confined space preventing easy opening of a door.

As will be explained later, the channels join together to surround some openings of the cabinet and to prevent water or other liquids accumulating in the structure. They prevent the least quantity of liquid entering the cabinet on opening a door or removing a panel. The same channels are designed to accommodate fixing blocks adapted to receive (generally fixed) panel fixing means of the cabinet and door pivots.

According to an advantageous other feature of the invention the fold defining the boundary between said first and second parts defines a longitudinal groove running along one side of the corresponding wall of said first part so as to form on the outside of the fold a rounded edge of said longitudinal slot. Said rounded edge facilitates the fitting of a removable panel by guiding the tabs on the panel. The groove is used to immobilize a fixing block, as will emerge more clearly from the following description. The structural element as defined above may be easily obtained by longitudinal folding of a strip of steel, advantageously supplied from a spool, (by means of appropriate rollers). The strip is preferably zinc-plated on both sides to prevent any corrosion inside the completed structural element.

The invention will be better understood and other advantages of the invention will emerge more clearly from the following description of a metal cabinet frame in accordance with the invention given by way of example only and with to the appended drawings.

DETAILED DESCRIPTION OF PREFERRED EMBODIMENTS

Figure 1:
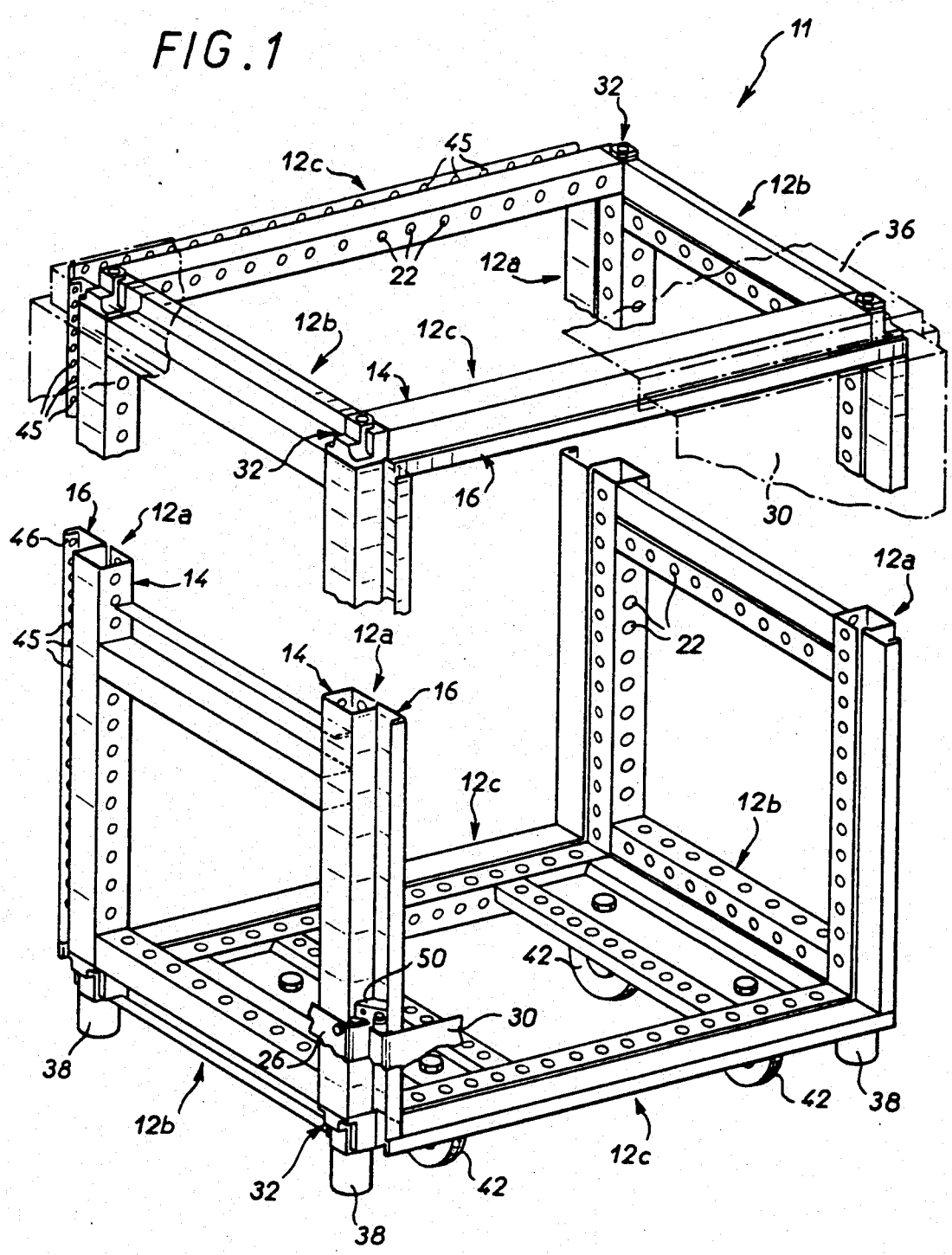
FIG. 1 is a partial perspective view of a metal cabinet frame showing the mounting of panels and doors represented by cutaway portions in the vicinity of a fixing block.

In the drawings, the metal frame 11 is mainly constructed from sections of the same metal structural element 12. These sections are denoted 12a, 12b, 12c according to their location. The structural element is obtained by folding a strip of metal, steel in this example, zinc-plated on both sides. The longitudinal folds are formed by a roller machine (not shown) whose design will be obvious to the man skilled in the art and which does not form part of the invention.

Figure 2:
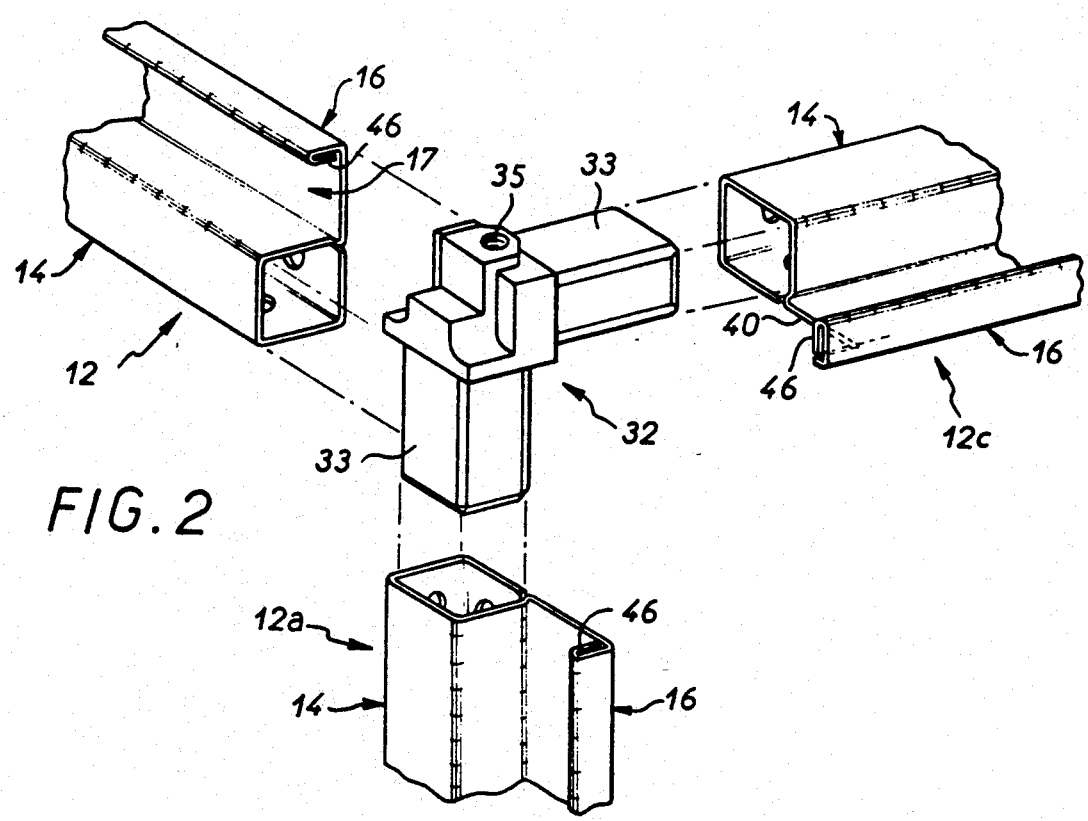
FIG. 2 is a partial perspective exploded view showing the interconnection of three sections of said structural element.

The result of this forming operation is a simple structural element comprising (FIGS. 2 and 6) a substantially square cross-section first part 14 (this could be rectangular) and an L-shaped second part 16 attached to the side of said first part so as to define with it a U-shape channel 17. The parallel folds in the steel strip are substantially at right angles and, as clearly shown in FIG. 6, the edge 18 of one side of said first part 14 (marked 14a in the drawings) is formed by a longitudinal edge of the metal strip used and this edge 18 faces a fold 19 defining the boundary between said first and second parts. Also, a space of sufficient width is left between the outside of the fold 19 and the edge 18 to define a longitudinal slot 20 for the insertion of removable panel mounting means. A panel of this kind, intended to replace a door, for example, is not shown but the mounting means in question are conventional and well known. They are, for example, simple tabs mounted near edges of said panel and adapted to be inserted in the slots 20 of the uprights and/or crossmembers defining the panel mounting frame.

Figure 4:
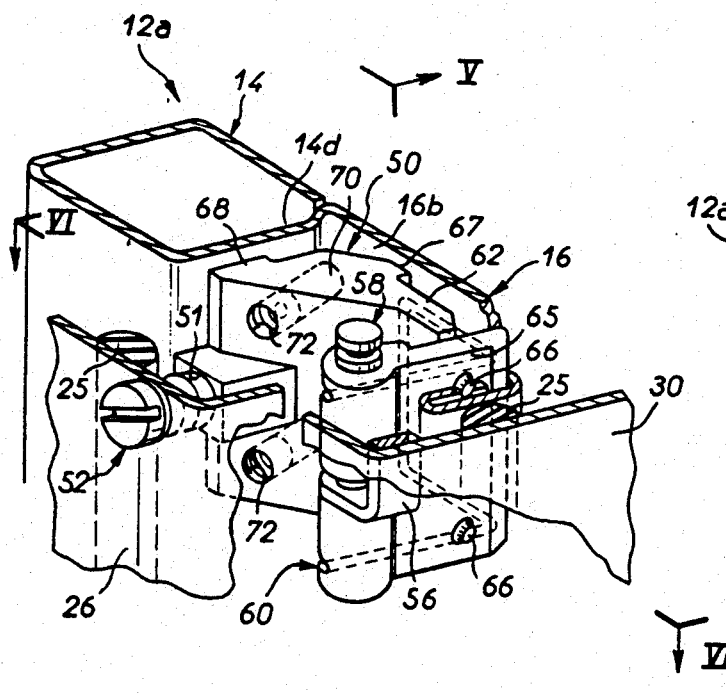
FIG. 4 is a perspective detail view showing the mounting of a fixing block in a channel.
Figure 6:
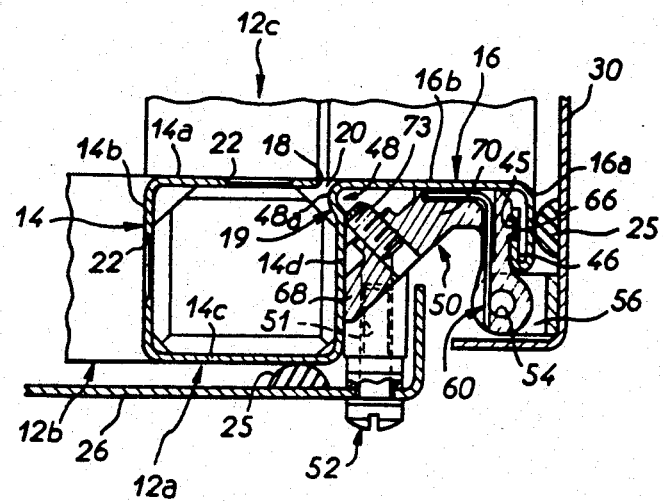
FIG. 6 is another detail view in cross-section on the line VI—VI in FIG. 4.

The face 14a of said first part 14 is an inside face and the section of structural element is designed to be assembled so that the face 14a faces towards the inside of the cabinet. It comprises a row of holes 22 for fixing equipment. The holes are spaced by a predetermined and standardized distance. Another inside face 14b adjacent the face 14a also comprises a row of holes 22 for the same purpose. The two outside faces 14c, 14d of said first part 14 do not comprise any holes in this example. The face 14c constitutes a bearing surface for a seal. FIGS. 4 and 6 show a seal 25 carried by a side panel 26. This may be a known type seal made from neoprene associated with a metal strand to block electromagnetic interference.

Figure 3:
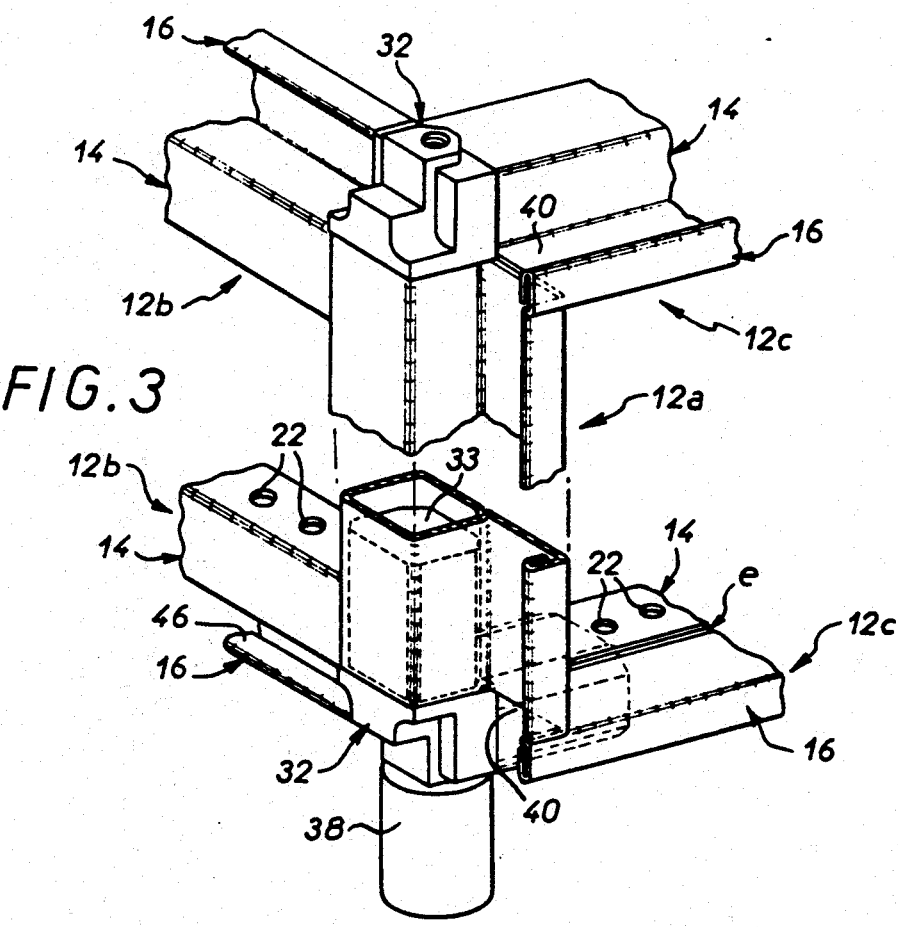
FIG. 3 is another partial perspective view showing the assembly of three sections at the top of the frame and three sections at the bottom of the frame.

At least one face of said second part 16 constitutes a seal bearing surface. FIGS. 4 and 6 show that another seal 25 of the same type as that described above is carried by a door 30 and applied against the face 16a, the narrowest face of said second part 16, defining in cross-section the shorter branch of the L-shape. The other face 16b of said second part merges with the face 14d of the first part through a fold at substantially 90°, to be described in more detail later. The faces 14a and 16b to either side of the slot 20 are substantially coplanar. The sections 12 are cut to the required dimensions to define uprights 12a, longitudinal members 12b and crossmembers 12c (FIG. 1) which are welded together at their ends. In this context, "uprights" refers to the vertical sections of the frame, "crossmembers" refers to the horizontal sections defining with the uprights a front or rear frame and "longitudinal members" refers to the horizontal sections defining with the uprights a side frame. Welded assembly is facilitated and strengthened by the insertion at the corners of the frame of solid metal connecting parts 32 comprising two segments 33 at right angles to each other and each having a shape and dimensions complementary to those of the tubular part of the first part of the structural element in which it is inserted. Each connecting part 32 further comprises a screwthreaded hole 35 which can be used to fix a cabinet top 36 in the case of the four connecting parts 32 at the top or to fix feet 38 or a metal plinth or any other ground-fixing accessories in the case of the four connecting parts at the bottom. The uprights, longitudinal members and crossmembers are disposed as follows: two uprights 12a and two top and bottom crossmembers 12c forming a door frame are welded together so that their channels 17 join end to end at the outside and so that the faces 16a of the sections form a rectangular frame against which the door seal bears. To this end an appropriate notch 40 (see FIGS. 2 and 3) is formed at each end of each crossmember to obtain a door frame without gaps at the corners.

Any liquid sprayed onto the cabinet therefore flows over the panels, the doors or the top and possibly in the channels of a frame of this kind, without penetrating to the interior.

The two top longitudinal members 12b are mounted so that said channels are open towards the outside and upwards whereas the bottom longitudinal members 12b are mounted so that said channels are open towards the outside and downwards. The top 36 is lipped around its perimeter and these lips enter the channels of the crossmembers and cover those of the longitudinal members. The frame may be provided with wheels 42 mounted on special longitudinal members at its bottom.

Other important features of the metal structural element 12 will now be described. Firstly, one face of said second part 16, in this instance the face 16a, is provided on the inside with a row of blind holes 45. These holes therefore open into the channel 17. They are formed by through-holes in a marginal area 46 of the original metal strip. This marginal area is folded on itself longitudinally. It therefore forms most of the face 16a of said second part 16 which in cross-section defines the shorter branch of the L-shape. This fold also renders inaccessible the often sharp edge of the original metal strip.

Figure 5:
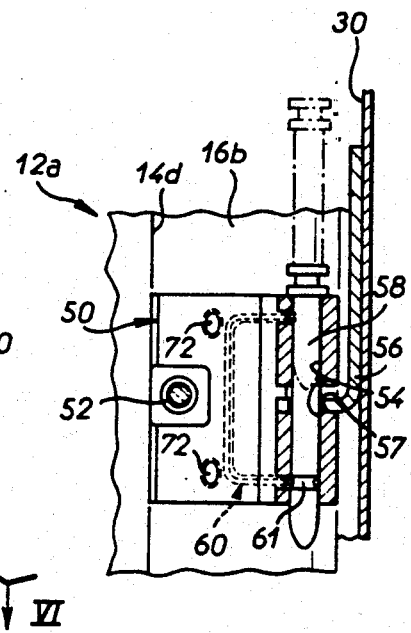
FIG. 5 is another detail view in cross-section on the line V—V in FIG. 4.

The fold 19 mentioned above forming the boundary between said first and second parts defines a longitudinal groove 48 along one side of the corresponding face of said first part, which is the face 14b in this case, so as to form on the outside of the fold a rounded edge 48a of said longitudinal slot 20. A first function of this groove is, by virtue of this rounding along the slot 20, to facilitate the insertion of removable panel fixing means. A second function of the groove is to cooperate with the blind holes 45 in mounting fixing blocks 50 to be described next. The fixing blocks 50 are accommodated in the channels of some sections. A fixing block is shown in FIGS. 4 through 6. It comprises at least one screwthreaded hole 51 adapted to receive a panel fixing screw 52. It preferably also comprises a bore 54 forming a bearing perpendicular to the hole 51 adapted to receive a door pivot. In this example the bore 54 is in two aligned and spaced parts (FIG. 5) so that a pivot lug 56 attached to an adjacent door 30 is inserted between the two parts for the door to pivot. The lug 56 comprises a hole 57 which is positioned between the two parts of the bore. A fixed pivot pin 58 inserted into the two aligned parts of the bore passes through the hole. The pivot pin 58 is immobilized in the bore 54 by a spring 60 at least one branch of which is inserted in a lateral groove 61 of said pivot pin. The spring is immobilized under load in a recess 62. The recess 62 defines with the wall of the channel 17 a housing for said spring. The spring is U-shape with the two branches bent at approximately 90° to bear against the pivot pin 58.

The fixing block 50 has an engagement face adapted to be applied against the inside face 16a of said second part 16 and provided with at least one peg 66 (two in this example) adapted to engage in one of the blind holes 45 described above. The fixing block further comprises two bearing faces 67, 68 oriented to bear against the other faces of the channel and an oblique wing 70 through which is formed at least one screwthreaded hole 72 receiving a screw 73.

In the example shown the fixing block comprises two screwthreaded holes 72 each receiving a screw. These holes are positioned and oriented so that the screws can enter the longitudinal groove 48 described above to immobilize the fixing block in the channel 17. When said fixing block is positioned at the required location in the channel, with its pegs 66 inserted in two adjacent blind holes, it is sufficient to screw in the two screws 73 until they enter the groove 48 to prevent the block escaping from the channel 17 by preventing pivoting of the block which would enable the pegs to escape from the blind holes (this can be seen clearly in FIG. 6).

I claim:

1. Metal cabinet frame at least partly constructed from sections (12) of the same structural element comprising a substantially rectangular cross-section first part (14) and an L-shape cross-section second part (16) joined to said first part so as to define with it a channel (17), wherein sd two parts are defined by parallel folds substantially at right angles in a single metal strip, the edge (18) of one face of said first part is constituted by a longitudinal edge of said metal strip, this edge facing a fold (19) defining the boundary between said first part and said second part, there being a space between said fold and said edge so as to define a longitudinal slot (20) enabling the insertion of panel mounting means.

2. Metal frame according to claim 1, wherein two adjacent inside faces (14a, 14b) of said first part of a section each comprise a row of holes (22).

3. Metal frame according to claim 1, wherein at least one outside face (14c) of said first part of a section constitutes a bearing surface for a seal (25).

4. Metal frame according to claim 1, wherein at least one face (16a) of said second part (16) of a section constitutes a bearing surface for a seal (25).

5. Metal frame according to claim 1, wherein one face of said second part is provided on its inside with a row of blind holes (45).

6. Metal frame according to claim 5, wherein said blind holes are through-boles in a marginal area (46) of said metal strip which is folded on itself longitudinally.

7. Metal frame according to claim 1, wherein said fold (19) defining the boundary between said first and second parts defines a longitudinal groove (48) along one side of the corresponding face (14d) of said first part so as to form outside the fold a rounded edge (48a) of said longitudinal slot (20).

8. Metal frame according to claim 7, which further comprises fixing blocks (50) housed in the aforementioned channels (12) of some sections, a fixing block comprising at least one screwthreaded hole (51) adapted to receive a panel fixing screw (52).

9. Metal frame according to claim 7, which further comprises fixing blocks (50) housed in the aforementioned channels (12) of some sections, said fixing blocks each comprising at least one bore (54) adapted to receive a door pivot pin.

10. Metal frame according to claim 7, wherein one face of said second part is provided on its inside with a row of blind holes (45), further comprising a fixing block having an engagement face 965) adapted to bear against a face of said channel and provided with at least one peg (66) adapted to be inserted into a said blind hole, bearing faces (67, 68) oriented to bear against the other faces of said channel and an oblique wing (70) through which is formed at least one screwthreaded hole (72) receiving a screw (73), said hole being positioned and oriented so that said screw can enter said longitudinal groove (48) in order to immobilize the fixing block in said channel.

11. Metal frame according to claim 10, wherein said fixing block comprises a bore (54) in two aligned and spaced parts, and a pivot lug (57) attached to an adjacent door is engaged between the two parts of said bearing and comprises a hole (57) through which passes a fixed pivot pin (58) inserted in the two aligned parts of said bore.

12. Metal frame according to claim 11, wherein said fixed pivot pin (58) is immobilized in said bore by a spring (60) engaged in at least one lateral groove of said pivot pin, said spring being immobilized under load in an appropriate recess (62) of said fixing block.

* * * * *